US011789183B2

(12) United States Patent
Beadie et al.

(10) Patent No.: US 11,789,183 B2
(45) Date of Patent: Oct. 17, 2023

(54) INDEPENDENT CONTROL OF BOTH INDEX AND DISPERSION IN GRADIENT INDEX OPTICS

(71) Applicant: The Government of the United States of America, as represented by the Secretary of the Navy, Arlington, VA (US)

(72) Inventors: Guy Beadie, Falls Church, VA (US); Richard Flynn, Newbury Park, CA (US); James S. Shirk, Alexandria, VA (US); Joseph Mait, Bethesda, MD (US); Predrag Milojkovic, Bethesda, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 303 days.

(21) Appl. No.: 17/069,849

(22) Filed: Oct. 13, 2020

(65) Prior Publication Data
US 2021/0026043 A1  Jan. 28, 2021

Related U.S. Application Data

(63) Continuation of application No. 15/723,215, filed on Oct. 3, 2017, now Pat. No. 10,802,180.

(60) Provisional application No. 62/408,099, filed on Oct. 14, 2016.

(51) Int. Cl.
G02B 3/00 (2006.01)
B29D 11/00 (2006.01)
G02C 7/02 (2006.01)

(52) U.S. Cl.
CPC ...... *G02B 3/0087* (2013.01); *B29D 11/00355* (2013.01); *G02C 7/028* (2013.01); *B29D 11/00788* (2013.01)

(58) Field of Classification Search
CPC ............ G02B 3/0087; B29D 11/00355; B29D 11/00788; G02C 7/028
See application file for complete search history.

(56) References Cited

U.S. PATENT DOCUMENTS 10,802,180 B2 * 10/2020 Beadie .................. G02C 7/028
2005/0105191 A1 * 5/2005 Baer ................ B29D 11/00355
359/652

* cited by examiner

*Primary Examiner* — James C. Jones
(74) *Attorney, Agent, or Firm* — US Naval Research Laboratory

(57) ABSTRACT

Three or more base optical materials are selectively combined into a trans-gradient index (GRIN) optical element (e.g., a lens). A wavelength-dependent index of refraction for light propagating perpendicular to the three or more optical materials equals: a volume fraction of a first optical material multiplied by a refractive index of the first optical material, plus a volume fraction of a second optical material multiplied by a refractive index of the second optical material, plus one minus the volume fraction of the first optical material and the volume of the second optical material all multiplied by the refractive index of a third optical material. The wavelength-dependent index of refraction distribution and a refractive index dispersion through the GRIN optical element may be independently specified from one another. A local refractive index at any point in the optical element is a fixed function of a refractive index of each individual optical material.

20 Claims, 5 Drawing Sheets

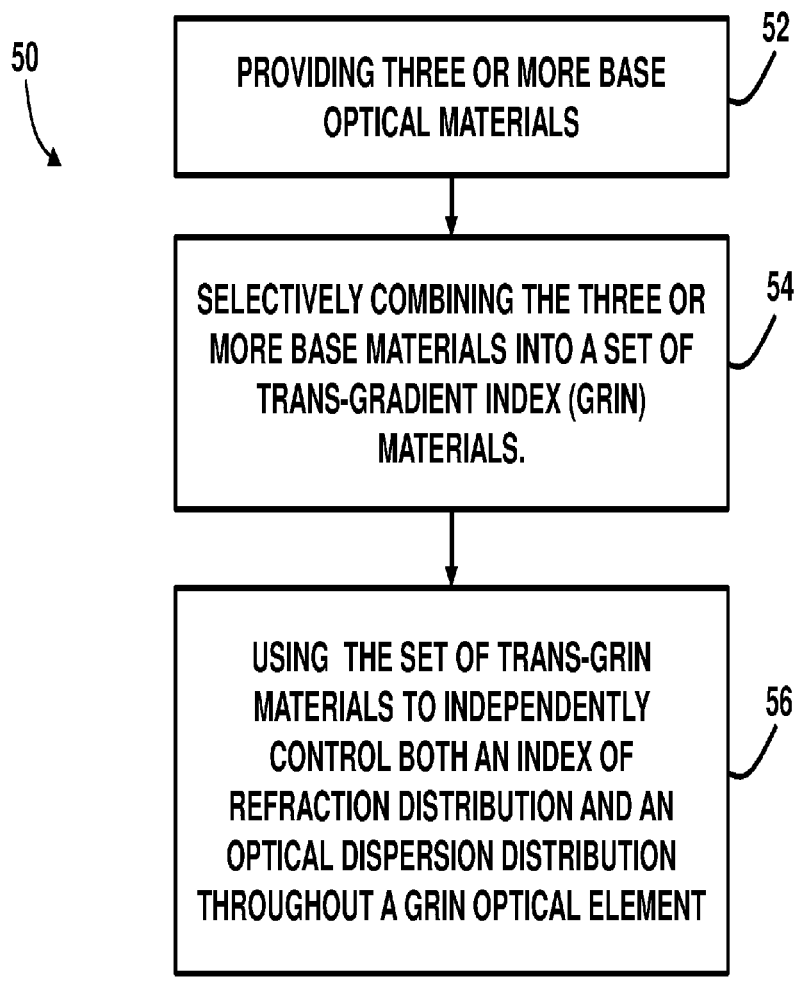

INDEPENDENT CONTROL OF BOTH INDEX AND DISPERSION IN GRADIENT INDEX OPTICS

CROSS REFERENCE TO RELATED APPLICATION

This application claims the benefit of U.S. Provisional Patent Application No. 62/408,099 filed on Oct. 14, 2016. The Provisional Application and all references cited herein are hereby incorporated by reference into the present disclosure.

GOVERNMENT INTEREST

The embodiments herein may be manufactured, used, and/or licensed by or for the United States Government without the payment of royalties thereon.

BACKGROUND

Technical Field

The embodiments herein generally relate to optics, and more particularly to gradient index optics.

Description of the Related Art

Engineering a gradient index (GRIN) distribution in a lens is a known potential benefit to optical design. In a GRIN lens, the material is not a constant throughout the lens, whereby light rays bend within the lens as well as at the surface. Primary, seminal works on GRIN optics concentrated on descriptions of the refractive index distribution within a lens as a mathematical construct as has been described by Sands, P. J., "Inhomogeneous lenses II. Chromatic paraxial aberrations," J. Opt. Soc. Am. 61(6) 777-783 (1971). The research is based on an extension of third-order aberration theory in optics, which treats the behavior of light rays as a combination of perfect behavior plus aberrations, where different aberrations are defined according to algebraic expressions which have different contributions from each lens element in an optical system. An algebraic description of these light rays required a similarly algebraic description of the index function and its variation with color. To be compatible with the treatment, the index function and its variation with color was simply assigned a multi-order polynomial expansion function, as further described by Krishna, K. S. R. et al., "Chromatic aberrations of radial gradient-index lenses. 1. Theory," Appl. Opt. 35(7) 1032-6 (1996). A GRIN lens may be approximated this way, after the fact. However, what is missing is how to predict what those properties would be for a lens, because in such a treatment there is no connection to the materials which make up the GRIN.

SUMMARY

In view of the foregoing, an embodiment herein provides a method comprising providing three or more base optical materials comprising a first base optical material, a second base optical material, and a third base optical material; selectively combining the three or more base optical materials into a set of trans-GRIN materials; and using the set of trans-GRIN materials to independently control both an index of refraction distribution and an optical dispersion distribution through a GRIN optical element. A wavelength-dependent index of refraction for light propagating perpendicular to the three or more base optical materials may equal: a volume fraction of the first base optical material multiplied by a refractive index of the first base optical material, plus a volume fraction of the second base optical material multiplied by a refractive index of the second base optical material, plus one minus the volume fraction of the first base optical material and the volume of the second base optical material all multiplied by the refractive index of the third base optical material.

A local refractive index at any point in the GRIN optical element is a fixed function of a refractive index of each individual base optical material of the three or more base optical materials. The three or more base optical materials may comprise polymer materials. The three or more base optical materials may comprise any of polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinyl acetate, a polyether-amide, a styrene-acrylonitrile copolymer, a styrene-ethylene copolymer, poly(ethylene-1,4-cyclohexylenedimethylene terephthalate), an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, and urethane rubber. The three or more base optical materials may comprise glass. The three or more base optical materials may comprise different materials.

Another embodiment provides a trans-GRIN lens comprising a selective combination of three or more base optical materials comprising a first base optical material, a second base optical material, and a third base optical material, wherein a wavelength-dependent index of refraction for light propagating perpendicular to the combined three or more base optical materials comprises a combination of: a volume fraction of the first base optical material combined with a refractive index of the first base optical material, a volume fraction of the second base optical material combined with a refractive index of the second base optical material, and one minus the combined volume fraction of the first base optical material and the volume of the second base optical material all multiplied by the refractive index of the third base optical material. The wavelength-dependent index of refraction distribution and a refractive index dispersion through the GRIN lens are independently specified from one another. A local refractive index at any point in the lens is a fixed function of a refractive index of each individual base optical material of the three or more base optical materials. The three or more base optical materials may comprise polymer materials. The polymer materials may comprise thermoplastic polymeric materials. The three or more base optical materials may comprise glass. The three or more base optical materials may comprise different materials.

Another embodiment provides a system comprising a fusing device that selectively combines at least three base optical materials into one GRIN lens, and a control unit that drives the fusing device to independently control both an index of refraction distribution and an optical dispersion distribution through the GRIN lens. The at least three base optical materials comprise a first base optical material, a second base optical material, and a third base optical material, wherein the index of refraction distribution $(n(\lambda)^2)$ for light propagating perpendicular to the combined at least three base optical materials is represented by: $n(\lambda)^2=\varphi_A n_A(\lambda)^2+\varphi_B n_B(\lambda)^2+(1-\varphi_A-\varphi_B)n_C(\lambda)^2$, and wherein $\varphi_A$ is a volume fraction of the first base optical material, $\varphi_B$ is a volume fraction of the second base optical material, $\varphi_C$ is a volume fraction of the third base optical material, $n_A(\lambda)^2$ is a refractive index of the first base optical material, $n_B(\lambda)^2$ is a refractive index of the second base optical material, and $n_C(\lambda)^2$ is a refractive index of the third base optical material. In an embodiment, $nA(\lambda)<nB(\lambda)<nC(\lambda)$, and volume fractions φA and φB may be both non-negative values whose sum is less than 1. The at least three base optical materials may comprise polymer materials. The at least three base optical materials may comprise glass.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 is a flow diagram illustrating a method, according to an embodiment herein;

DETAILED DESCRIPTION

Figure 1:
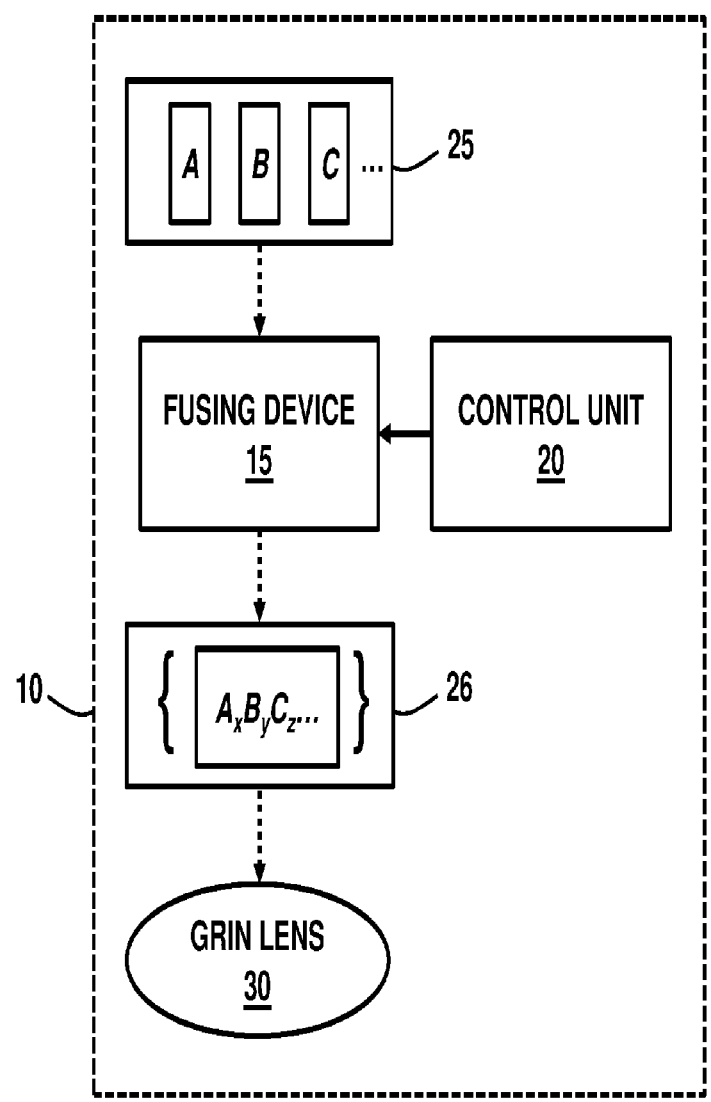
FIG. 1 is a block diagram of a system, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An embodiment herein provides an optical lens configuration technique, enabling an optical engineer to tailor both the refractive index distribution and refractive index dispersion within an optical element, independently. The embodiments herein provide a trans-GRIN lens, which uses three or more base materials, and blends them in a way that allows for independent control of both the index and dispersion throughout the lens. The canonical literature for GRIN lens design generally fails to connect GRIN distributions with material distributions, which the embodiments herein overcome. Referring now to the drawings, and more particularly to FIGS. 1 through 5C, where similar reference characters denote corresponding features consistently throughout the figures, there are shown exemplary embodiments.

The use of three or more base optical materials within a single optical element to control both an index distribution and, independently, the optical dispersion distribution throughout the element volume, as provided by the embodiments herein, is a departure from conventional GRIN technology. Optical dispersion is the variation of the refractive index with wavelength. All materials exhibit dispersion, which means each lens element in a GRIN lens treats different wavelengths of light differently. Any system, GRIN or otherwise, designed for more than one wavelength must account for this effect.

A GRIN lens comprising two materials may be designed to control the relative concentration of the two component materials, at a length scale much smaller than the wavelength of light. An example two component polymer GRIN lens and method of fabrication is described in U.S. Pat. No. 7,002,754, the complete disclosure of which, in its entirety, is herein incorporated by reference. In such cases the local refractive index at any point is some fixed function of the refractive index of each individual material. For example, in a nanolayered system of polymers A and B, where each layer is much thinner than the wavelength of light, the wavelength-dependent index of refraction $n(\lambda)$ for light propagating perpendicular to the layers is given by:

$$n(\lambda)^2=\varphi_A n_A(\lambda)^2+(1-\varphi_A)n_B(\lambda)^2 \quad (1)$$

where φA is the volume fraction of polymer A, $nA(\lambda)$ is the refractive index of polymer A, and $nB(\lambda)$ is the refractive index of polymer B. Since φA is a volume fraction, its value is between 0 and 1. Moreover, a GRIN can be created by generating a position-dependent variation in the relative weight fraction $\varphi A(r)$ of polymer A. Once defined, however, the dispersion distribution $dn(r)/d\lambda$ of such a GRIN is fixed, because the index depends on the single position-dependent variable $\varphi A(r)$. In other words, since the index for a GRIN blended from A and B depends on the single variable φA then this variable also describes all the dispersion information, as well.

With a given material pair to generate the GRIN effect, however, there is a fixed relationship between the index distribution and the distribution of dispersion. The bandwidth over which achromatic performance can be achieved is limited to the fixed relationship between the material pair and their dispersion curves.

The model given in Eq. (1) is only one of many models that can relate the volume fraction φA to index. Also, there are other common GRIN systems, such as ion-diffused glass systems, whose index can't be described as a simple, linear combination of two dispersion curves. However, what most of these systems share is the single-parameter dependence of index on position, such as the relative concentration of the mobile ion in ion-diffused glasses. With only a single parameter to describe the index, the fixed relationship between index and dispersion remains.

In the trans-GRIN methodology provided by the embodiments herein, Eq. (1) is expanded to include the addition of a third constituent material. The index for a ternary material system can be described by:

$$n(\lambda)^2 = \varphi_A n_A(\lambda)^2 + \varphi_B n_B(\lambda)^2 + (1-\varphi_A-\varphi_B) n_C(\lambda)^2 \quad (2)$$

where it will be assumed that $nA(\lambda) < nB(\lambda) < nC(\lambda)$, and the volume fractions φA and φB make physical sense; i.e., that they are both non-negative values whose sum is less than 1, with the constraint that φC is given by (1−φA−φB).

A consequence of this model is that there are identical values of index achieved by a whole set of different materials. Since nB(λ) lies between the values for A and C, for example, one can achieve nB(λ) by constructing a pure B material (φB=1, φA=φC=0) or by having no B material, and blending A and C in just the right amounts to average out to nB(λ). Depending on the nature of the three pure materials, these two different choices could have vastly different dispersion values.

The freedom afforded by the third material is that, for a range of index values between the minimum nA and maximum nC values of index, the index n and dispersion dn/dλ may be selected independently. For example, a material with the same intermediate index nX can be achieved with either a relatively A-rich or a relatively C-rich mixture. When the A material has less dispersion than the C material, the former mixture will have less dispersion than the latter, affording optical engineers a choice of dispersion values for the same index value nX. An immediate extension of this concept is that, should a fourth material be added, the index, the first-order dispersion, and the second-order dispersion $d^2n/d\lambda^2$ may be specified independently. For each new material added to a blend, an additional order of the dispersion may be controlled. The above process describes the origin of material combinations which may, as a set, be used to fabricate a gradient index optical element. The processes of fabricating a GRIN optic are separate, and may include: (a) stacking, molding, and shaping a multilayered polymer lens, (b) cutting and polishing ion-exchanged glass blanks (rods, flats, or slumped flats) containing multi-component diffused species, (c) additive manufacturing techniques, such as ink-jet printing, which might start with print heads that contain (i) pre-mixed trans-GRIN materials, or (ii) base materials, to form trans-GRIN materials simultaneously during the printing of the GRIN element, or (d) any other process which leverages the combination of three or more materials to provide independent control of both index and dispersion distributions throughout a GRIN optic.

Figure 5A:
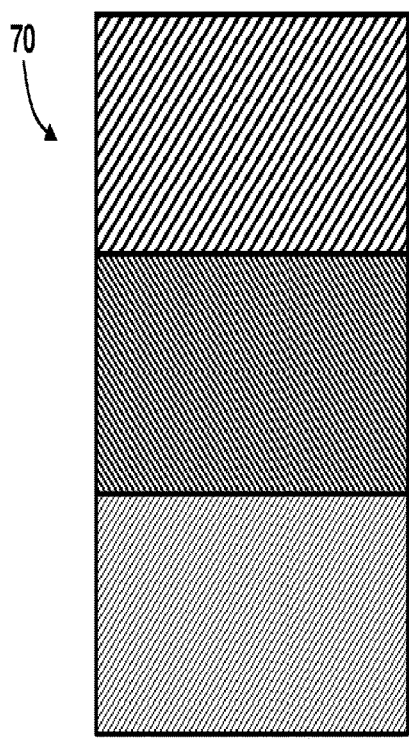
FIG. 5A is a cross-sectional diagram illustrating stacked optical materials, according to an embodiment herein.

FIG. 1 is a block diagram of a system 10, according to an embodiment herein. The system 10 comprises a fusing device 15 that selectively combines at least three base optical materials 25 into one trans-GRIN lens 30. The fusing device 15 receives each of the base optical materials 25, which may be configured as composite films comprising raw (pure) materials A, B, and C. Each composite film comprises a different refractive index. An ordered set of these multi-layered composite films are assembled into a hierarchical multilayered composite GRIN sheet 26 with the desired index gradient. An example of a GRIN sheet 26 arranged in a composite stack 70 is shown in FIG. 5A. These multilayered composite GRIN sheets 26 are shaped into a lens 30. Sheet 26 may comprise a whole set of different materials, each with its own ratio of $A_x:B_y:C_z:<D:\text{etc.}>$, which are combined into a GRIN lens 30. Each multilayered polymer composite film may comprise up to 500,000 layers alternating between at least three types of materials: A, B, and C.

A control unit 20 drives the fusing device 15 to independently control both an index of refraction distribution and an optical dispersion distribution through the GRIN lens 30. The at least three base optical materials 25 comprise a first base optical material A, a second base optical material B, and a third base optical material C, wherein the index of refraction distribution ($n(\lambda)^2$) for light propagating perpendicular to the combined at least three base optical materials is represented by Eq. (2). Intervening components, devices, and sub-systems may be included in between the various components and devices shown in FIG. 1, but are not depicted for the sake of clarity.

FIG. 2, with reference to FIG. 1, is a flow diagram illustrating a method 50 comprising providing (52) three or more base optical materials 25 comprising a first base optical material A, a second base optical material B, and a third base optical material C. The method 50 may further comprise selectively combining (54) the three or more base optical materials 25 into a set of trans-GRIN materials 26, wherein a wavelength-dependent index of refraction for light propagating perpendicular to the three or more base optical materials 25 is represented by Eq. (2).

The method 50 may further comprise using (56) the trans-GRIN materials 26 to independently control both an index of refraction distribution and an optical dispersion distribution through a GRIN optical element (e.g., GRIN lens 30). A local refractive index at any point in the GRIN optical element (e.g., GRIN lens 30) is a fixed function of a refractive index of each individual base optical material of the three or more base optical materials 25. The three or more base optical materials 25 may comprise glass, in one example. The three or more base optical materials 25 may comprise different materials, in another example. The three or more base optical materials 25 may include blends of two or more polymers or copolymers, and may comprise components that are substantially miscible, thus not affecting the transparency of the blend. Example polymeric materials include a poly(vinylidene fluoride) (PVDF) and copolymers thereof, a poly(methyl methacrylate), a poly(ethylene naphthalate) (PEN), and a polycarbonate.

The three or more base optical materials 25 may comprise polymer materials, in an example. As used herein, the term "polymer" may refer to a material having a weight average molecular weight (Mw) of at least 5,000. In another example, the polymer comprises an organic polymer material. In an embodiment, the polymer materials may comprise thermoplastic polymeric materials, such as glassy, crystalline, or elastomeric materials.

Furthermore, in another example, the three or more base optical materials 25 may comprise any of polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinyl acetate, a polyether-amide, a styrene-acrylonitrile copolymer, a styrene-ethylene copolymer, poly(ethylene-1,4-cyclohexylenedimethylene terephthalate), an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, and urethane rubber.

Figure 3A:
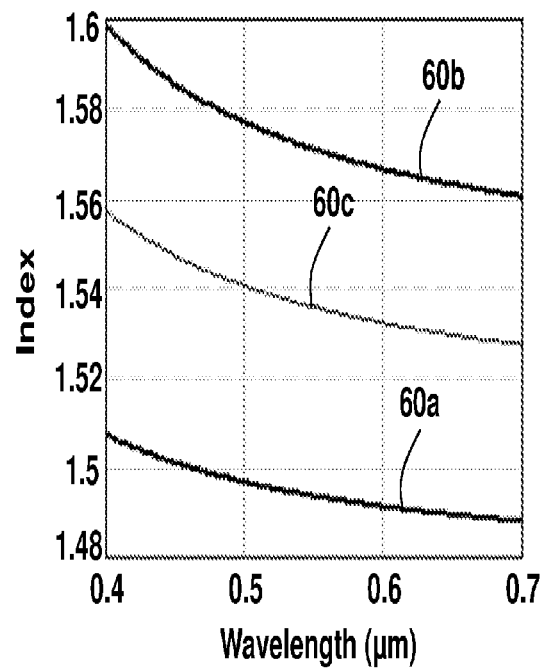
FIG. 3A is a graph illustrating a first index vs. dispersion curve, according to an embodiment herein.
Figure 3B:
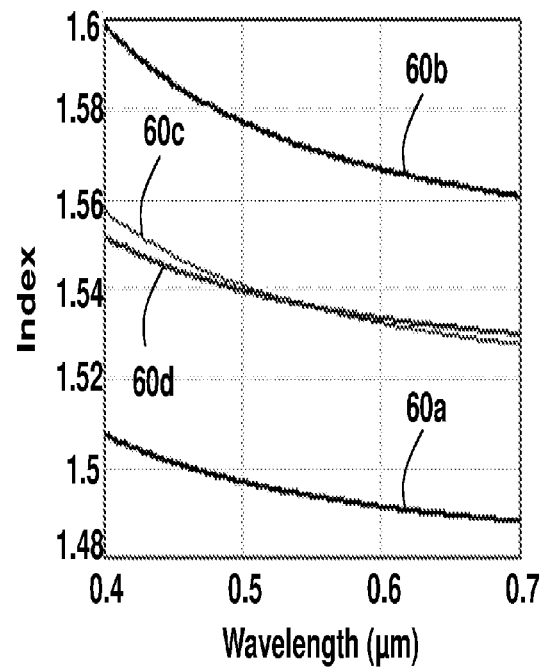
FIG. 3B is a graph illustrating a second index vs. dispersion curve, according to an embodiment herein.
Figure 3C:
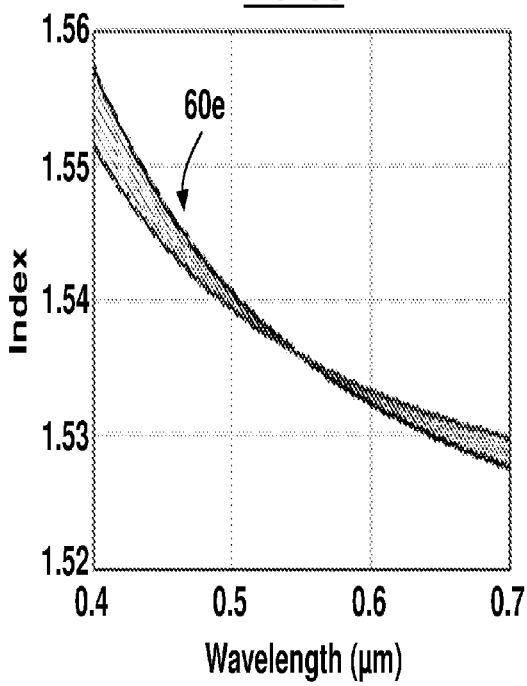
FIG. 3C is a graph illustrating a third index vs. dispersion curve, according to an embodiment herein.

FIGS. 3A through 3C, with reference to FIGS. 1 and 2, are graphs illustrating index vs. dispersion curves, according to the embodiments herein. FIG. 3A shows bolded curves 60a, 60b which represent the dispersion functions of two base materials which may be combined to form a set of materials with index curves that lie between them. While these particular curves correspond to the optical polymers styrene acrylonitrile (SAN) and poly(methyl methacrylate) (PMMA), it is understood that the concept is generalized to any two materials which may be combined to form a gradient index optical element. The intermediate, thinner curve 60c in FIG. 3A represents one particular blend of SAN and PMMA, with ~54% SAN. FIG. 3B contains the same three curves 60a, 60b, 60c as depicted in FIG. 3A with the addition of a third bold curve 60d representing a third optical polymer, TOPAS® material. TOPAS® material has an index of refraction equal to that of the intermediate curve 60c at a wavelength of approximately 0.5 µm. TOPAS® material, however, is less dispersive. In other words, the slope of the TOPAS® material dispersion curve 60d is shallower than the slope of the 54% SAN:PMMA dispersion curve 60c. FIG. 3C illustrates, as thin lines, the dispersion curves 60e for a family of materials which would be generated if one were to blend TOPAS and 54% SAN:PMMA together, in analogy to the way in which SAN and PMMA are blended together in FIG. 3A. All the intermediate materials have identical index values at the wavelength of approximately 0.5 µm, but each has a different dispersion.

Figure 4A:
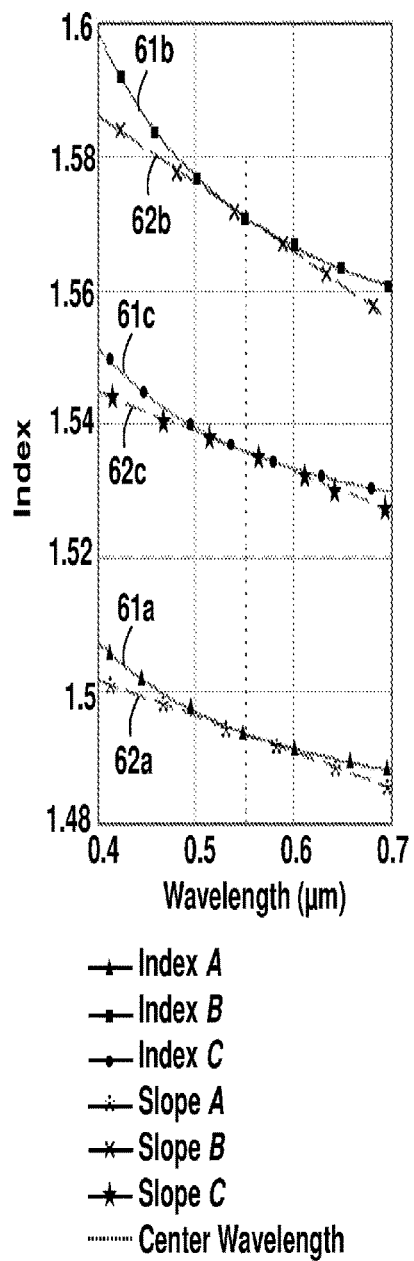
FIG. 4A is a graph illustrating a fourth index vs. dispersion curve, according to an embodiment herein.
Figure 4B:
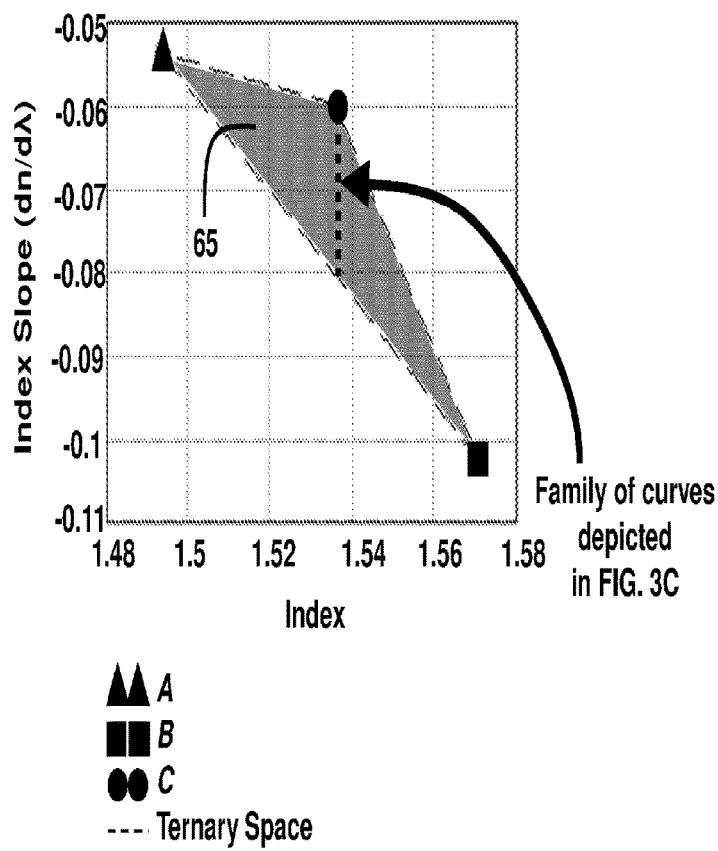
FIG. 4B is a graph illustrating an index slope vs. index curve, according to an embodiment herein.

FIGS. 4A and 4B, with reference to FIGS. 1 through 3C, represent the broader range of materials offered by a ternary material combination, according to an embodiment herein. FIG. 4A depicts the dispersion curves 61a, 61b, 61c of materials A, B, and C (which for the sake of illustrative values represent PMMA, SAN, and TOPAS® material in these curves, respectively). Also depicted by tangent lines 62a, 62b, 62c are the slopes of these curves 61a, 61b, 61c, respectively, at a specific, design wavelength of approximately 0.5 µm. In FIG. 4B, the shaded area 65 represents the combinations of index and dispersion available to a ternary blend of optical materials 25 provided by the embodiments herein. Each vertex (denoted by a triangle, circle, and square) of the shaded area 65 represents one of the three, base materials, as given by the values of FIG. 4A. Each edge of the polygon (which, strictly speaking, would be slightly curved) represents the possible binary combinations of the two base materials which they connect. For example, the longest edge between material A (triangle) and material B (square) represents the all values accessed by a binary combination of A and B. By adding the third material C, however, one adds not just the two extra edges on this plot—it opens up the entire space bounded between them. The greater the separation between the original vertices, the greater the area afforded by a ternary mixture among them, and the greater choice of material values afforded to an optical design engineer. The family of curves illustrated in FIG. 3C are represented on FIG. 4B as the vertical line which connects vertex C (TOPAS® material) to the AB edge. All the materials along this line have the same index value at approximately 0.5 µm but different dispersion values, which demonstrates the ability to independently control both index and dispersion throughout a GRIN optical element, in accordance with the embodiments herein.

Figure 5B:
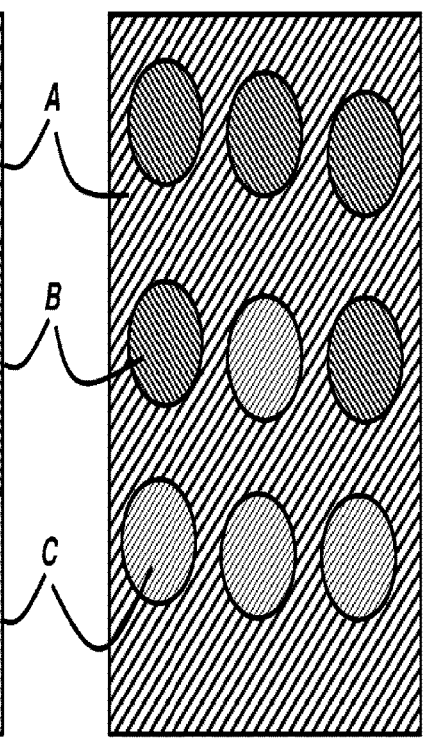
FIG. 5B is a cross-sectional diagram illustrating a ternary material, according to an embodiment herein.
Figure 5C:
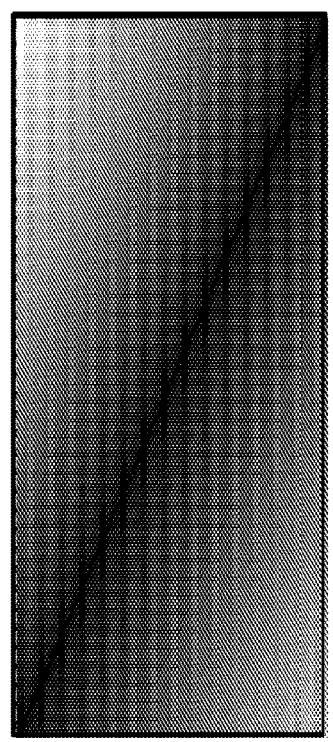
FIG. 5C is a cross-sectional diagram illustrating a material with two dopants, according to an embodiment herein.

FIGS. 5A through 5C, with reference to FIGS. 1 through 4B, illustrate several cross-sectional diagrams illustrating base optical materials A, B, and C arranged in different ways to form an A:B:C ternary blend 70 according to an embodiment herein. In FIG. 5A, for example, materials A, B, and C are layered with a period small enough ($<\lambda/10$) that the composite blend 70 acts as an effective medium. The composite blend 70 may be formed by extruding and layering materials A, B, and C. The multilayered polymer composite films may be fabricated with a range of refractive indexes and an arbitrarily small index difference between them. In one example, this may be accomplished by altering the relative thicknesses of the A, B, and C layers. Similarly, FIG. 5B shows another embodiment of a ternary material—subwavelength doping of materials B and C into a host A, in such a way that local volumes ($<(\lambda/10)^3$) have controlled volume fractions of B and C. FIG. 5C represents a material with two dopants which could be co-diffused into a host to control its optical properties. In each of FIGS. 5A through 5C, the diagrams represent a single ternary combination. A trans-GRIN lens would be fabricated through the assembly of a whole set of these combinations, utilizing the independent control of index and dispersion to meet optical design goals.

The embodiments herein combine three or more base materials 25 into a single trans-GRIN lens 30. While a two-material GRIN blend may provide flexibility in designing a customizable refractive index profile inside a lens, a three-material (or higher) GRIN lens 30, as provided by the embodiments herein, provides the degrees of freedom necessary to independently specify the dispersion profile inside the lens 30.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A method of forming a gradient index (GRIN) optical element, comprising the steps of:
receiving, at a fusing device, a plurality of base optical materials including a first base optical material, a second base optical material, and a third base optical material, wherein each of the plurality of base optical materials has a different refractive index;
driving the fusing device, under the control of a controller, to selectively combine the plurality of base optical materials to form a multilayered composite GRIN sheet that includes a plurality of alternating layers of the first base optical material, the second base optical material, and the third base optical material to independently control both an index of refraction distribution and an optical dispersion distribution through the multilayered composite GRIN sheet; and
shaping the multilayered composite GRIN sheet to form a GRIN optical element.

2. The method of claim 1, wherein a wavelength-dependent index of refraction for light propagating perpendicular to the multilayered composite GRIN sheet equals:
a volume fraction of the first base optical material multiplied by a refractive index of the first base optical material, plus a volume fraction of the second base optical material multiplied by a refractive index of the second base optical material, plus one minus the volume fraction of the first base optical material and the volume of the second base optical material all multiplied by a refractive index of the third base optical material.

3. The method of claim 1, wherein a local refractive index at any point in the GRIN optical element is a fixed function of a refractive index of each individual base optical material of the plurality of base optical materials.

4. The method of claim 1, wherein the plurality of base optical materials comprise polymer materials.

5. The method of claim 1, wherein the plurality of base optical materials comprise any of: polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinyl acetate, a polyether-amide, a styrene-acrylonitrile copolymer, a styrene-ethylene copolymer, poly(ethylene-1,4-cyclohexylenedimethylene terephthalate), an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, and urethane rubber.

6. The method of claim 1, wherein the plurality of base optical materials comprise glass.

7. The method of claim 1, wherein the plurality of base optical materials comprise different materials.

8. A trans-gradient index (GRIN) optical element, comprising:

a multilayered composite GRIN sheet formed from a plurality of alternating layers of a plurality of base optical materials, respectively, the plurality of base optical materials including a first base optical material, a second base optical material, and a third base optical material, wherein each of the plurality of base optical materials has a different refractive index, wherein a wavelength-dependent index of refraction for light propagating perpendicular to the multilayered composite GRIN sheet is determined by:

a volume fraction of the first base optical material combined with a refractive index of the first base optical material, a volume fraction of the second base optical material combined with a refractive index of the second base optical material, and one minus the combined volume fraction of the first base optical material and the volume of the second base optical material all multiplied by the refractive index of a third base optical material.

9. The trans-gradient index (GRIN) optical element of claim 8, wherein the wavelength-dependent index of refraction distribution and a refractive index dispersion through the trans-gradient index (GRIN) optical element are independent from one another.

10. The trans-gradient index (GRIN) optical element of claim 8, wherein a local refractive index at any point in the trans-gradient index (GRIN) optical element is a fixed function of a refractive index of each optical material of the plurality of base optical materials.

11. The trans-gradient index (GRIN) optical element of claim 8, wherein the plurality of base optical materials comprise polymer materials.

12. The trans-gradient index (GRIN) optical element of claim 11, wherein the polymer materials comprise thermoplastic polymeric materials.

13. The trans-gradient index (GRIN) optical element of claim 8, wherein the plurality of base optical materials comprise glass.

14. The trans-gradient index (GRIN) optical element of claim 8, wherein the plurality of base optical materials comprise different materials.

15. A system for forming a multilayered composite gradient index (GRIN) sheet, comprising:

a fusing device constructed to receive a plurality of base optical materials including a first base optical material, a second base optical material, and a third base optical material, wherein each of the plurality of base optical materials has a different refractive index; and a control unit constructed to drive the fusing device to selectively combine the plurality of base optical materials to form a multilayered composite GRIN sheet that includes a plurality of alternating layers of the first base optical material, the second base optical material, and the third base optical material to independently control both an index of refraction distribution and an optical dispersion distribution through the multilayered composite GRIN sheet.

16. The system of claim 15, wherein the index of refraction distribution $(n(\lambda)^2)$ for light propagating perpendicular to the multilayered composite GRIN sheet is represented by: $n(\lambda)^2 = \varphi_A n_A(\lambda)^2 + \varphi_B n_B(\lambda)^2 + (1-\varphi_A-\varphi_B)n_C(\lambda)^2$, and wherein $\varphi_A$ is a volume fraction of the first base optical material, $\varphi_B$ is a volume fraction of the second base optical material, $n_A(\lambda)^2$ is a refractive index of the first base optical material, $n_B(\lambda)^2$ is a refractive index of the second base optical material, and $n_C(\lambda)^2$ is a refractive index of the third base optical material.

17. The system of claim 16, wherein $n_a(\lambda) < n_b(\lambda) < n_c(\lambda)$.

18. The system of claim 16, wherein volume fractions $\varphi_A$ and $\varphi_B$ are both non-negative values whose sum is less than 1.

19. The system of claim 15, wherein the plurality of base optical materials comprise polymer materials.

20. The system of claim 15, wherein the plurality of base optical materials comprise glass.

* * * * *